United States Patent [19]
Dalal et al.

[11] Patent Number: 6,115,469
[45] Date of Patent: Sep. 5, 2000

[54] TELEPHONE LINE RING SIGNAL AND DC POWER GENERATOR

[75] Inventors: Dhaval Dalal, Merrimack, N.H.; Jimmy A. Walker, San Diego, Calif.

[73] Assignee: Unitrode Corporation, Merrimack, N.H.

[21] Appl. No.: 09/139,809

[22] Filed: Aug. 25, 1998

[51] Int. Cl.[7] .............................. H04M 7/00; H02M 5/00
[52] U.S. Cl. ......................... 379/418; 379/413; 379/399; 379/377
[58] Field of Search .................................. 379/377, 399, 379/413, 418

[56] References Cited

U.S. PATENT DOCUMENTS

| | | | |
|---|---|---|---|
| 3,597,551 | 8/1971 | Arneberg et al. | 179/84 VF |
| 3,609,591 | 9/1971 | Hensbergen | 331/108 B |
| 3,626,201 | 12/1971 | Chambers, Jr. | 307/127 |
| 3,660,609 | 5/1972 | Tremblay | 179/16 F |
| 3,683,118 | 8/1972 | Vago et al. | 179/18 HB |
| 3,886,321 | 5/1975 | Krasin et al. | 179/84 R |
| 3,903,375 | 9/1975 | DeWit | 179/18 HB |
| 4,071,709 | 1/1978 | Lee et al. | 179/18 HB |
| 4,132,864 | 1/1979 | Feng | 179/18 FA |
| 4,156,150 | 5/1979 | Harrigan et al. | 307/2 |
| 4,161,633 | 7/1979 | Treiber | 179/170.2 |
| 4,166,930 | 9/1979 | Rovnyak | 179/18 HB |
| 4,201,897 | 5/1980 | Dorth et al. | 179/84 R |
| 4,205,204 | 5/1980 | Clenney | 179/16 F |
| 4,254,305 | 3/1981 | Treiber | 179/16 F |
| 4,435,803 | 3/1984 | Das et al. | 370/16 |
| 4,445,007 | 4/1984 | Forestier | 179/175.3 R |
| 4,492,821 | 1/1985 | Kopetzky | 179/18 FA |
| 4,538,031 | 8/1985 | Benning et al. | 179/81 B |
| 4,598,173 | 7/1986 | Chea, Jr. et al. | 179/18 AA |
| 4,600,811 | 7/1986 | Hayashi | 179/16 AA |
| 4,894,766 | 1/1990 | De Agro | 363/159 |
| 4,899,358 | 2/1990 | Blakley | 379/67 |
| 4,922,490 | 5/1990 | Blakley | 370/110.1 |
| 4,975,949 | 12/1990 | Wimsatt et al. | 379/387 |
| 5,007,076 | 4/1991 | Blakley | 379/67 |
| 5,027,391 | 6/1991 | O'Neill | 379/373 |

(List continued on next page.)

OTHER PUBLICATIONS

Advanced Data Sheet for Unitrode UCC3751, from Unitrode Data Book published, Mar. 1997, prior to Aug. 25, 1997.

Am79R79 Ringing SLIC Device Technical Overview; Advanced Micro Devices, Publication # 19768, Issue Data: May 1997.

Phillips Geoff, "The HC–5502X/4X Telephone Subscriber Line Interface Circuits (SLIC)," Harris Corporation—No. AN549.1, Jan. 1997.

Primary Examiner—David R. Hudspeth
Assistant Examiner—Susan Wieland
Attorney, Agent, or Firm—Weingarten, Schurgin, Gagnebin & Hayes LLP

[57] ABSTRACT

A ring generator circuit provides both a ring signal and talk battery to a subscriber telephone line. The ring generator recognizes whether talk battery voltage or a ring signal voltage is required and supplies the right voltage without the use of external relays. A switching network is coupled to the primary of a transformer to generate AC power at the transformer secondary. The switches intermittently conduct current from a DC power source through the primary of the transformer at a frequency substantially greater than the ring signal. A rectifier circuit converts the generated AC power into DC power to be provided to the telephone line. A sampling circuit samples the AC power, and the sampled power is additively combined with the DC power from the rectifier to form a ring signal component whose frequency is equal to the difference between the sampling frequency and the AC power frequency. When a ring signal is to be provided to the line, the AC power is sampled at a frequency that differs from the AC power frequency by the desired ring signal frequency. When talk battery is to be provided to the line, the AC power is sampled at the same frequency as the frequency of the AC power, so that the resulting AC component of the telephone line voltage is zero.

15 Claims, 6 Drawing Sheets

U.S. PATENT DOCUMENTS

| | | | |
|---|---|---|---|
| 5,144,652 | 9/1992 | Smits | 379/102 |
| 5,224,155 | 6/1993 | Satomi et al. | 379/100 |
| 5,233,649 | 8/1993 | Guerra, Jr. | 379/372 |
| 5,260,996 | 11/1993 | Dillon et al. | 379/418 |
| 5,285,371 | 2/1994 | Sanada et al. | 363/71 |
| 5,321,596 | 6/1994 | Hurst | 363/8 |
| 5,323,461 | 6/1994 | Rosenbaum et al. | 379/399 |
| 5,406,623 | 4/1995 | Rovik | 379/418 |
| 5,428,682 | 6/1995 | Apfel | 379/413 |
| 5,459,788 | 10/1995 | Kim | 379/399 |
| 5,490,210 | 2/1996 | Sasso | 379/100 |
| 5,535,265 | 7/1996 | Suwandhaputra | 379/97 |
| 5,636,274 | 6/1997 | Youngblood | 379/413 |
| 5,663,878 | 9/1997 | Walker | 363/159 |
| 5,694,465 | 12/1997 | Apfel | 379/377 |
| 5,790,653 | 8/1998 | Fairbanks, Sr. et al. | 379/372 |
| 5,790,654 | 8/1998 | Eklof | 379/375 |

TELEPHONE LINE RING SIGNAL AND DC POWER GENERATOR

CROSS REFERENCE TO RELATED APPLICATIONS

None

REGARDING FEDERALLY SPONSORED RESEARCH OR DEVELOPMENT

Not Applicable

BACKGROUND OF THE INVENTION

The present invention relates to the field of telephony, and more particularly to interface circuitry for providing a ring signal and DC power to a telephone subscriber line.

All telephones require an alerting signal or ring signal for notifying a subscriber of an incoming phone call. Early telephones employed mechanical bells that rang in response to an electrical ringing signal appearing on the telephone line. Backward compatibility requirements have kept the characteristics of the ringing signal essentially the same over the last century. The mechanical bells require a low frequency, high voltage AC signal for ringing. The amplitude of the ring signal has to be relatively high, for example 45 volts AC at the phone, and the frequency quite accurate to ring the phone without fail.

In the past, ring generation was handled at the central office, and the ring generator supplied ring signals to many telephone lines. The ring generator was continuously in a single mode (i.e., ringing), and lines were randomly connected to the ring generator when a ring signal was needed. External logic and switching circuitry were used for each telephone line to allow the line to be connected to or disconnected from the ring generator as required.

The ring generator design to meet the above-described requirements is a challenging power conversion problem. Because of the centralization of prior ring generation, this design challenge was confined to a low volume, higher power level application, where efficiency and cost were not always the driving considerations. In recent years, due to proliferation of newer telecommunication networks, the ring generation function has shifted away from the central office, and thus newer designs have been required that are more tailored to the environments in which they operate. At the utmost, ring generation can occur at the individual subscriber or single line level, in which case cost and efficiency become paramount concerns because of the high volumes involved. The industry trends of Fiber-to-the-Home (FTTH), Wireless Local Loop (WLL), ISDN Terminal Adapters, and Cable Set Top Boxes (STB) could all require a local ring generator for interfacing to the Plain Old Telephone System (POTS).

There are circuits being implemented today for ring generation that address both cost and efficiency concerns. However, many of these circuits do not meet existing standards for ring signals. For example, in order to cut costs, the ring signal used is trapezoidal instead of sinusoidal. The harmonic content of the trapezoidal signal generated by these circuits can create interference in adjacent lines or circuits.

This problem has been addressed in a technique described in U.S. Pat. No. 5,663,878 to Walker, presently assigned to Unitrode Corporation. The Walker patent describes a unique circuit for generating a low frequency sinusoidal signal for resonant ring generator applications. The circuit uses a switched DC to AC converter in which a sinusoidal AC output of a transformer is sampled at a frequency differing from the frequency of the sampled signal by 20 Hz, and the sampled output is filtered to obtain a 20 Hz sinusoidal ringing signal. The circuit is suitable for use with a single subscriber line as well as other configurations. Because the circuit generates a sinusoidal ring signal, it has less tendency to induce interference in adjacent telephone lines or circuits than the above-described solutions.

The circuit in the Walker patent does share one characteristic with prior ring generators. Telephone systems require a talk battery voltage, typically −48 volts DC loosely regulated, for each telephone line. The line is connected to the ring generator when a ring signal is needed, and otherwise is connected to the talk battery voltage source. Thus prior ring generators have been used with a separate talk battery voltage source, along with relays and additional logic to switch between the ring generator and the talk battery voltage source for each telephone line. Thus modern subscriber line interface circuits have unfortunately retained some of the circuitry burden from the time when ring generation was performed centrally. As a result, fuller benefits of de-centralizing the ring generation function have not previously been achieved.

BRIEF SUMMARY OF THE INVENTION

In accordance with the present invention, a ring generator circuit is disclosed that advantageously provides both a ring signal and talk battery voltage to a subscriber telephone line. The circuit exploits the fact that a telephone line can be in only one operating mode at a time. That is, when the line is ringing, it does not require talk battery voltage, and when it is off-hook or idle, it does not need the ringing voltage. The ring generator recognizes the required mode for the phone and supplies the right voltage. External apparatus such as relays for switching between ringing signal and talk battery are unnecessary, and therefore it is possible for subscriber line interfaces to be realized at reduced cost and improved performance.

The disclosed ring generator employs a switching network coupled to the primary of a transformer to generate AC power at the transformer secondary. The switches intermittently conduct current from a DC power source through the primary of the transformer at a frequency substantially greater than the ring signal to be provided to the telephone line. The ring signal consists of a low-frequency AC signal component superimposed on a DC voltage component. A rectifier circuit converts the generated AC power into DC power to be provided to the telephone line. A sampling circuit samples the AC power, and the sampled power is additively combined with the DC power from the rectifier to become a ring signal component whose frequency is equal to the difference between the sampling frequency and the AC power frequency. When a ring signal is to be provided to the line, the AC power is sampled at a frequency that differs from the AC power frequency by the desired ring signal frequency. When only talk battery is to be provided to the line, the AC power is sampled at the same frequency as the frequency of the AC power, so that the resulting AC component of the telephone line voltage is zero.

Because the talk battery voltage is generated by the same output stage from which the ring signal is generated, a separate talk battery voltage supply is unnecessary for many applications. Also, the switching of sampling frequencies can be performed easily in an integrated circuit used for the ring generator function, and thus the relay and other switching logic of prior telephone line interfaces are also rendered unnecessary. These features enable the present circuit to be used in cost-sensitive applications such as a single subscriber line interface.

Other aspects, features, and advantages of the present invention are disclosed in the detailed description which follows.

DETAILED DESCRIPTION OF THE INVENTION

Figure 1:
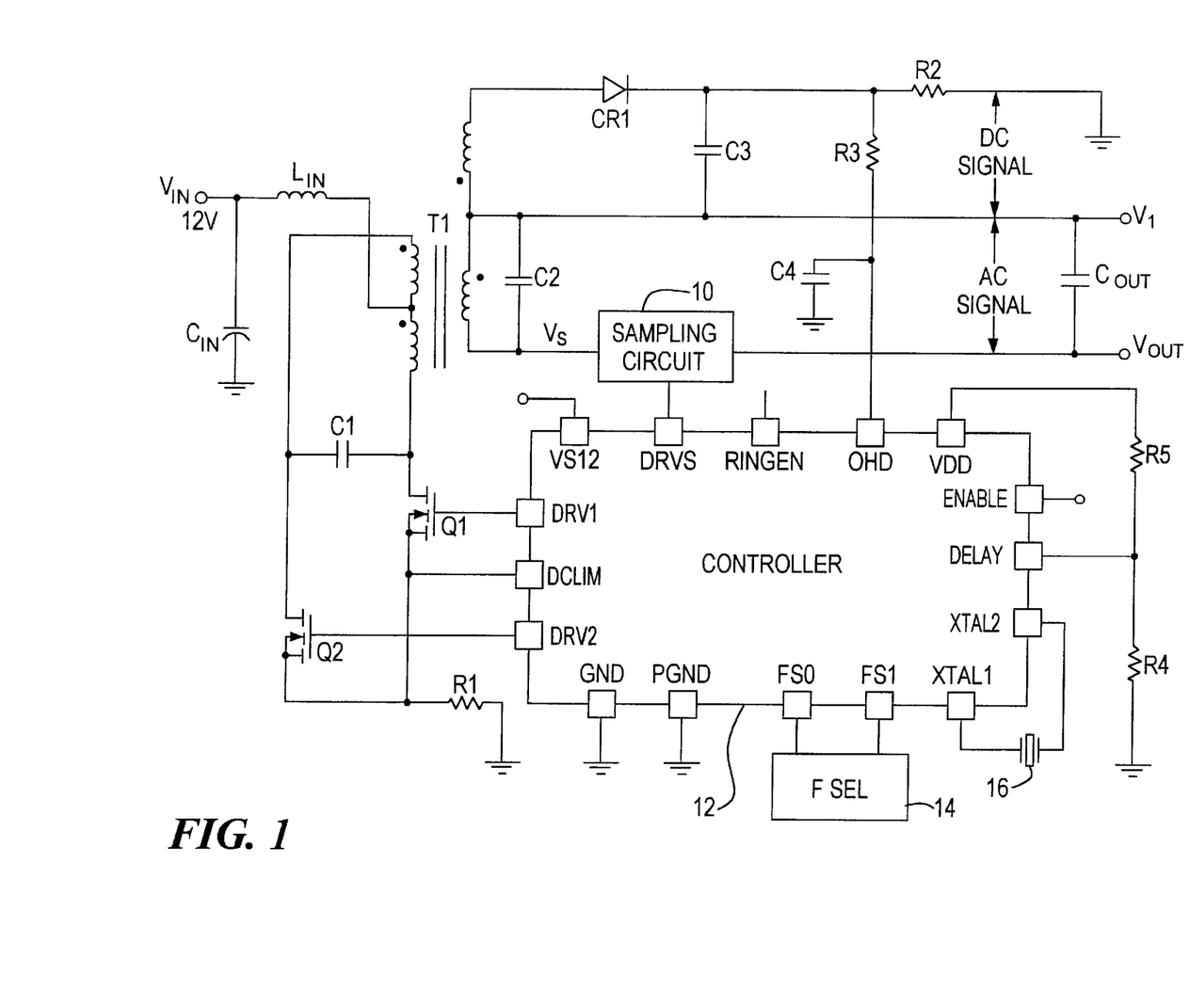
FIG. 1 is a schematic diagram of a ring signal and DC power generator circuit in accordance with the principles of the present invention.

Referring to FIG. 1, there is shown a schematic representation of a circuit for generating DC power and a ring signal for a telephone line. The circuit is designed to provide an output signal Vout having a DC component of approximately −48 volts sufficient to provide talk power for the telephone line. When a ring signal is to be provided, Vout includes a superimposed low-frequency sinusoidal AC ring signal with an amplitude of 85 volts RMS. As is described in greater detail below, the frequency of the ring signal is selectable from among 20 Hz, 25 Hz, and 50 Hz, which are common ring signals used in telephone systems.

The circuit of FIG. 1 receives 12 volt DC input power at an input node Vin, and provides a ring signal superimposed on −48 volts DC at an output node Vout. The circuit can be used to provide both −48V DC talk battery and a ringing signal or solely a ringing signal. When both talk battery and ringing signal are provided, the nodes Vout and ground are connected respectively to the tip and ring of a 2-wire telephone line. When solely the ringing signal is to be provided, the signal Vout is typically fed to a relay which selectively connects either Vout or an external talk battery source to the tip of the telephone line. −48 volts is available at node V1 for use by local circuitry in the subscriber line interface as may be convenient.

The input voltage source provided at Vin is converted into a current source by an inductor Lin, and the output power at Vout is filtered by a capacitor Cout. The circuit includes a resonant circuit formed of a transformer T1 and capacitors C1 and C2, a power switching network consisting of transistors Q1 and Q2, a rectifier including power diode CR1 and capacitor C3, sense resistors R1 and R2, a sampling circuit 10, a controller 12, frequency selection circuitry 14, and a crystal 16. Additional components are also included as described below.

The controller 12 generates signals DRV1 and DRV2 that control the conduction of transistors Q1 and Q2 respectively. The transistors Q1 and Q2 are alternatively turned on and off at 50% duty ratio at the rate of 89.488 KHz to allow current from the input supply to intermittently pass through inductor Lin and respective portions of the primary winding of the transformer T1. Appropriate values for the capacitors C1 and C2 and an appropriate turns ratio for the transformer T1 are selected so that a sinusoidal signal Vs having an amplitude of approximately 85 volts RMS and a frequency of 89.488 KHz appears across the capacitor C2. This sinusoidal signal is offset by −48 VDC through the action of the rectifier circuitry including diode CR1 and capacitor C3.

The sampling circuit 10 samples the sinusoidal signal Vs at the frequency of a pulsed signal DRVS generated by the controller 12. The sampling creates an AC component on the output signal Vout whose frequency is equal to the difference between the frequency of the sampling signal DRVS and the frequency of the sinusoidal signal Vs. As noted above, this difference frequency is zero when no ring signal is to be provided, so that the ring signal component of Vout is absent. The output capacitor Cout provides a filtering effect so that the ring signal when present is substantially sinusoidal and free of higher-frequency components.

The sense resistors R1 and R2 are used to sense the currents in the input and output stages, respectively. Sense resistor R1 is connected to an input DCLIM on the controller 12. The DCLIM signal is used by protection circuitry within the controller 12 to determine whether the input current exceeds a predetermined limit. Sense resistor R2 is connected via resistor R3 and capacitor C4 to an input OHD on the controller 12. The OHD signal is an "off-hook" indicating signal used by the controller 12 to prevent the generation of a ring signal when the telephone line is in an off-hook condition.

Additional resistors R4 and R5 are used to develop a signal DELAY provided to the controller 12. This signal is used by the controller 12 to control the phase of the sampling signal DRVS. As explained in greater detail below, the DC component of Vout can be fine-tuned by controlling the phase of the sampling signal DRVS using resistors R4 and R5.

The controller 12 has an input RINGEN to receive a ring cadencing signal generated by conventional circuitry not shown in FIG. 1. The cadencing signal is a pulse waveform that controls ringing in a known manner. For example, it can consist of a series of 2-second "on" pulses spaced by 2-second "off" periods. The ENABLE input can be used by circuitry not shown in FIG. 1 to place the controller 12 in a standby mode in which its outputs are all "off".

The frequency selection circuitry 14 establishes binary signal values on two inputs FS1 and FS0 of the controller 12. These values may be selected in any of a variety of known ways, for example by using pull-up and pull-down resistors connected to power or ground. The controller uses the signals FS1 and FS0 to select one of three commonly-used ring signal frequencies 20 Hz, 25 Hz and 50 Hz, as is described below.

The crystal 16 provides a signal having a frequency of 3.579545 MHz to the controller 12 via inputs XTAL1 and XTAL2. This signal is used by the controller 12 to generate several internal timing signals as described in greater detail below.

Figure 2:
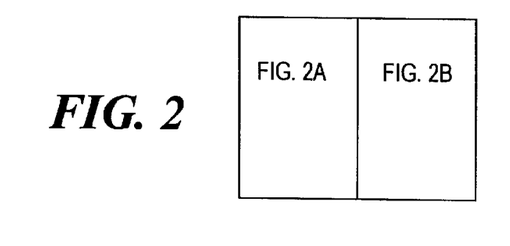
FIG. 2 (consisting of FIGS. 2A and 2B) is a schematic diagram of a controller circuit in the generator circuit of FIG. 1.
Figure 2A:
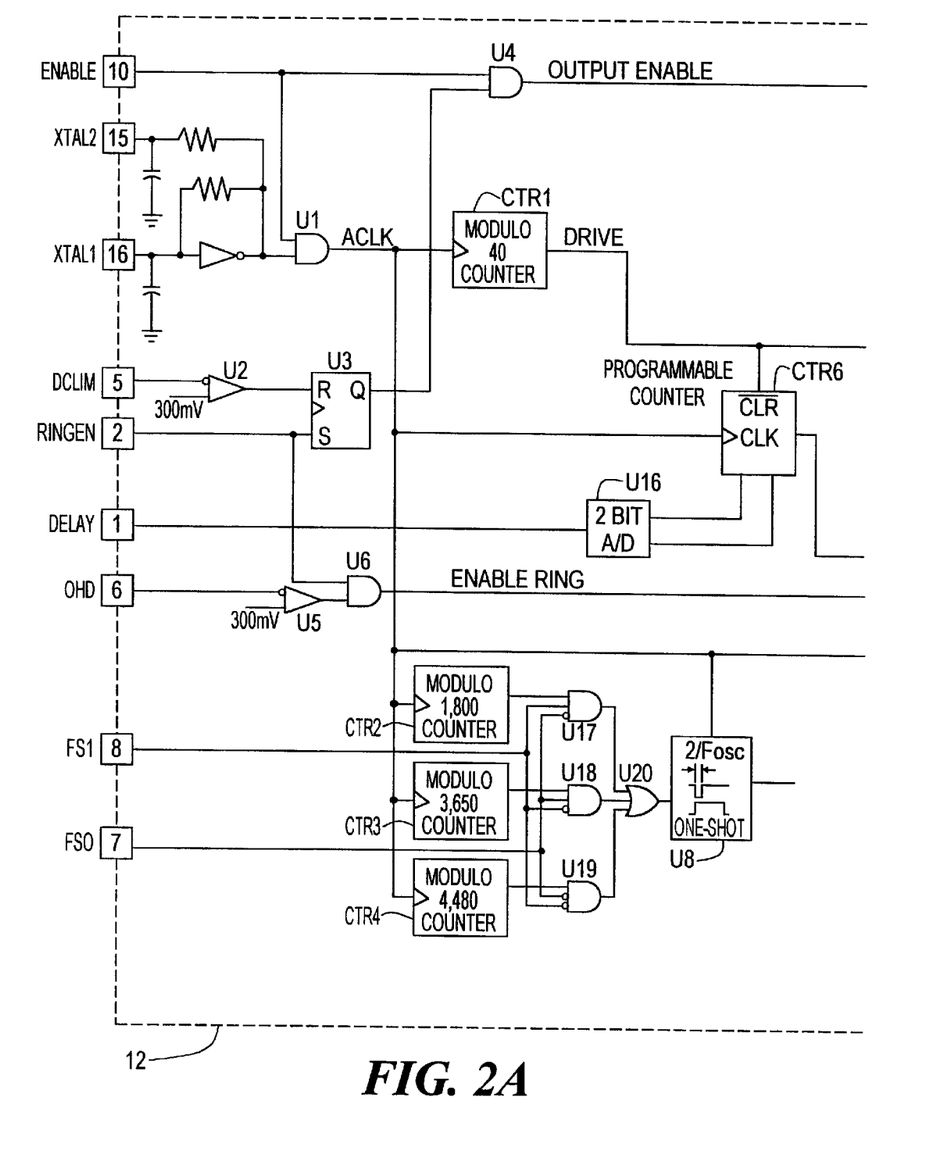
Figure 2B:
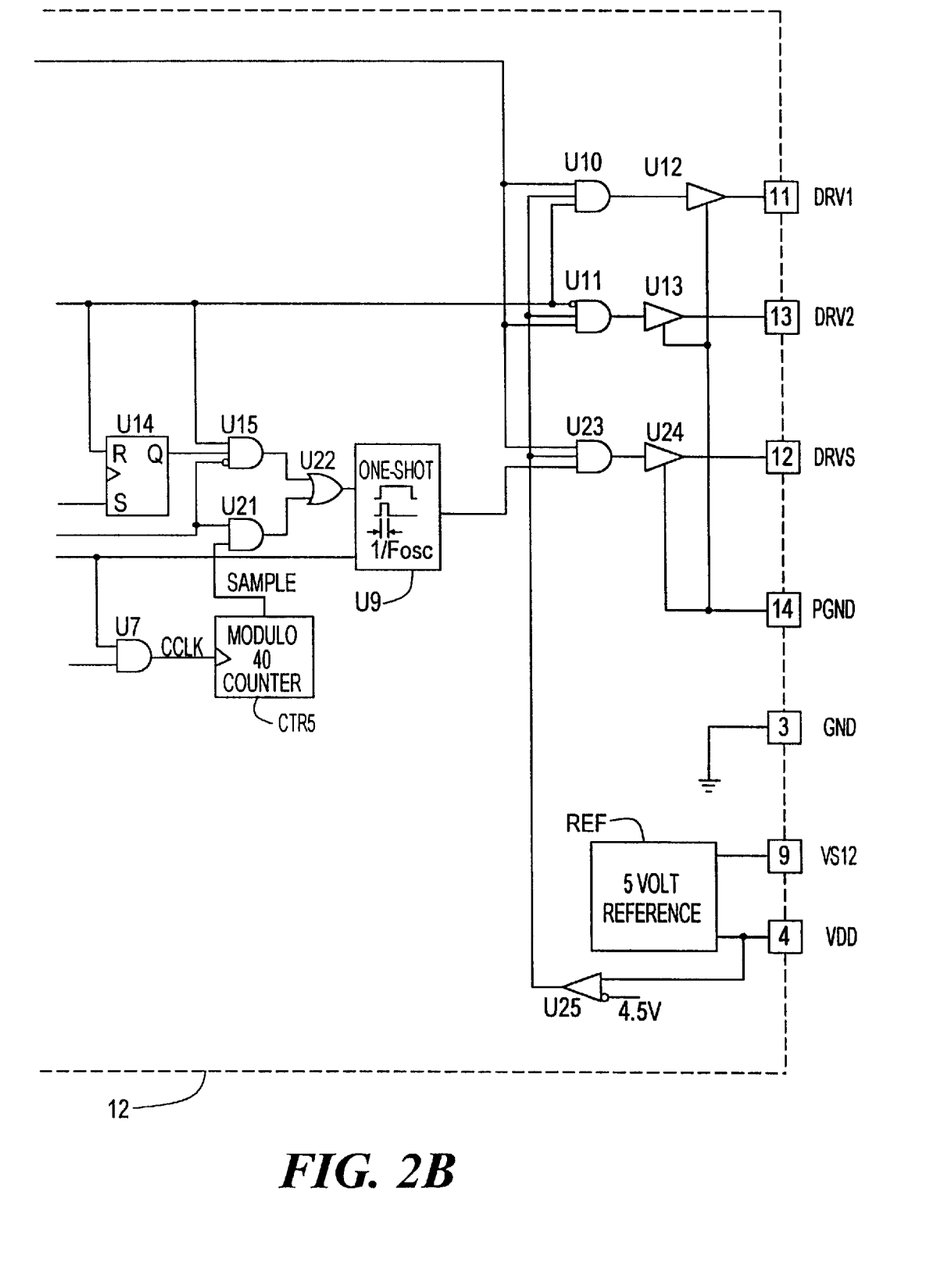

FIG. 2 shows circuitry within the controller 12. A signal ACLK is generated by an AND gate U1 from the inputs XTAL1 and XTAL2 when the ENABLE input is asserted. The ENABLE input is always asserted during non-standby operation. The signal ACLK is a 3.579545 MHz clock signal used by several counters within the controller as described below.

Protection circuitry including a comparator U2, a latch U3 and an AND gate U4 responds to an input over-current condition. The output of the AND gate U4 is a signal OUTPUT ENABLE used to enable the drivers for the drive signals DRV1 and DRV2 as well as the sampling signal DRVS. The signal OUTPUT ENABLE is asserted only when the input ENABLE is asserted and the output of latch U3 is asserted. The latch U3 is set by the assertion of RINGEN and reset when the input DCLIM exceeds 300 mV. Thus the output drivers are enabled only when the signal ENABLE is asserted and the input current as represented by DCLIM has not exceeded a predetermined limit since the last assertion of RINGEN.

A comparator U5 and an AND gate U6 form ring signal selection circuitry. A signal ENABLE RING is asserted when the signal RINGEN is asserted and the telephone line is on-hook, as determined by comparing the signal OHD with a 300 mV reference. The signal ENABLE RING is used in a manner described below to enable the ringing signal to appear on the telephone line.

The signal ACLK is provided to a modulo 40 counter CTR1, a modulo 1,800 counter CTR2, a modulo 3,650 counter CTR3, a modulo 4,480 counter CTR4, and another modulo 40 counter CTR5 via a 2-input AND gate U7. These counters act as frequency dividers to generate signals used in the generation of the drive signals DRV1, DRV2 and the sampling signal DRVS.

The output of the counter CTR1 is a pulsed signal DRIVE having a 89.488 KHz pulse rate. This pulsed signal is provided to 3-input AND gates U10 and U11, which respectively generate the drive signals DRV1 and DRV2 via drivers U12 and U13. Note that an active low input is used on the AND gate U11, so that the signal DRV2 is the inverse of the signal DRV1 during normal circuit operation.

The outputs of the counters CTR2, CTR3, and CTR4 are pulse signals having pulse rates of 1.989 KHz, 980.7 Hz, and 799 Hz respectively. These signals are provided to selection logic consisting of AND gates U17, U18, and U19 and OR gate U20. The selection logic responds to different combinations of the inputs FS1 and FS0 to select the output of the corresponding counter. The selected signal is provided to a one-shot pulse generator U8, whose output is used by AND gate U7 to generate a signal CCLK. The frequency of the signal CCLK differs from the frequency of the signal ACLK by the frequency of the selected counter output. The CCLK frequency is divided by 40 by counter CTR5 to generate a signal SAMPLE from which the sampling signal DRVS is generated as described below.

A circuit including a 2-bit A/D converter U16, a counter CTR6 and a latch U14 provides a variable-width pulse used for fine-tuning the DC output voltage at Vout. The analog value at the DELAY input is converted to a 2-bit value representing the pulse width as a number of ACLK cycles. The output of counter CTR6 is held low when the signal DRIVE is de-asserted, and remains low after the assertion of DRIVE until the programmed number of ACLK cycles have passed. The output of the counter CTR6 is used as the SET input for latch U14. The output of U14 is the same as the signal DRIVE except it has a delayed rising edge. This signal is used by the sampling signal generating circuitry as described below.

The sampling signal DRVS is generated by circuitry consisting of AND gates U15 and U21, OR gate U22, one-shot pulse generator U9, AND gate U23 and driver U24. The signal ENABLE RING is asserted when a ring signal is to be generated on the telephone line. In this case, the signal SAMPLE from counter CTR5 is used to trigger the one-shot U9. The signal SAMPLE has one of three different frequencies corresponding respectively to the three selectable ringing frequencies. The signal ENABLE RING is de-asserted when the ring signal is not to be generated. In this case, the output from the latch U14 triggers the one-shot U9. The output of U14 has the same frequency as the signal DRIVE, but with a variably delayed rising edge. Thus in this case the signal DRVS has the same frequency as the signals DRV1 and DRV2, and has a relatively delayed leading edge which causes a corresponding small adjustment in the DC voltage appearing on the node Vout. While DELAY allows unidirectional adjustment of DC voltage, adjustment in the other direction can be obtained by swapping DRV1 and DRV2.

The 12-volt DC input VS12 provides power to the output drivers U12, U13, and U24, and also to a 5 volt reference generator REF. The reference generator REF provides 5 volt power to all of the logic in the controller 12. The 5 volt output is provided to an output VDD for connection of a bypass capacitor and to power the resistor network R4-R5 of FIG. 1 that sets the value of the DELAY input. VDD is also fed to a comparator U25 along with a 4.5 volt reference. The output of the comparator U25 is fed to the AND gates U10, U11 and U23 as an additional output enable, so that the outputs DRV1, DRV2 and DRVS are disabled when the 5 volt reference is not available.

Figure 3:
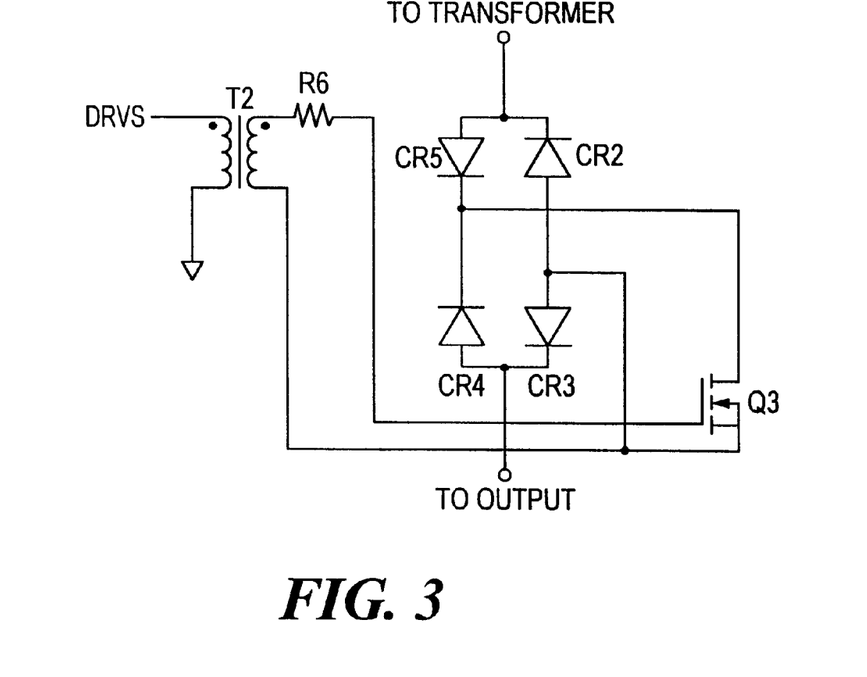
FIGS. 3 and 4 are schematic diagrams of alternative sampling circuits that can be used in the generator circuit of FIG. 1.
Figure 4:
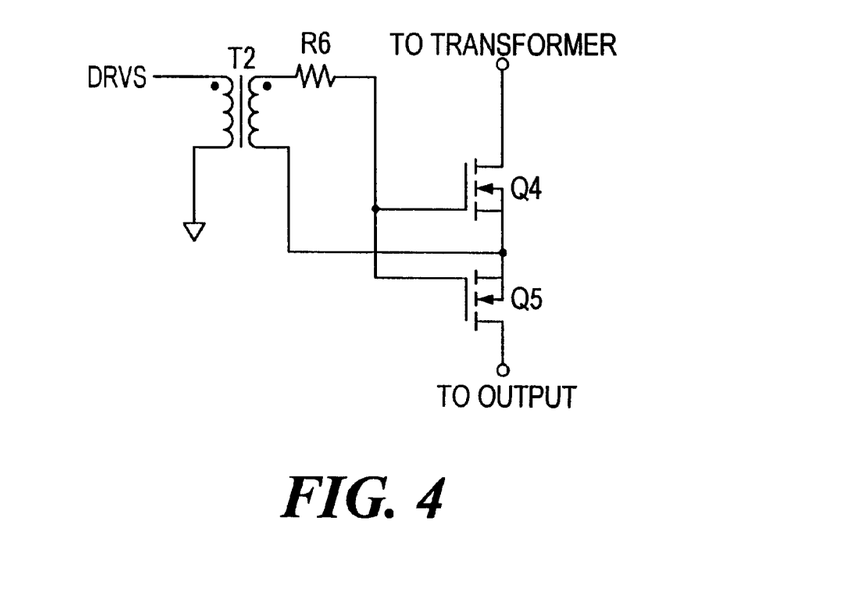

FIGS. 3 and 4 show different circuits that can be used as the sampling circuit 10 of FIG. 1. The sampling signal DRVS is coupled to either circuit via a pulse transformer T2 and resistor R6. The circuit of FIG. 3 employs a single FET switch Q3 and a full-bridge rectifier consisting of diodes CR2–CR5. Current flows through the switch when the signal DRVS is asserted, and the direction of current flow is determined by the polarity of the voltage across the switch terminals. The circuit of FIG. 4 employs two back-to-back FET switches Q4 and Q5 that also enable current flow in either direction through the switch when the DRVS signal is asserted.

Figure 5:
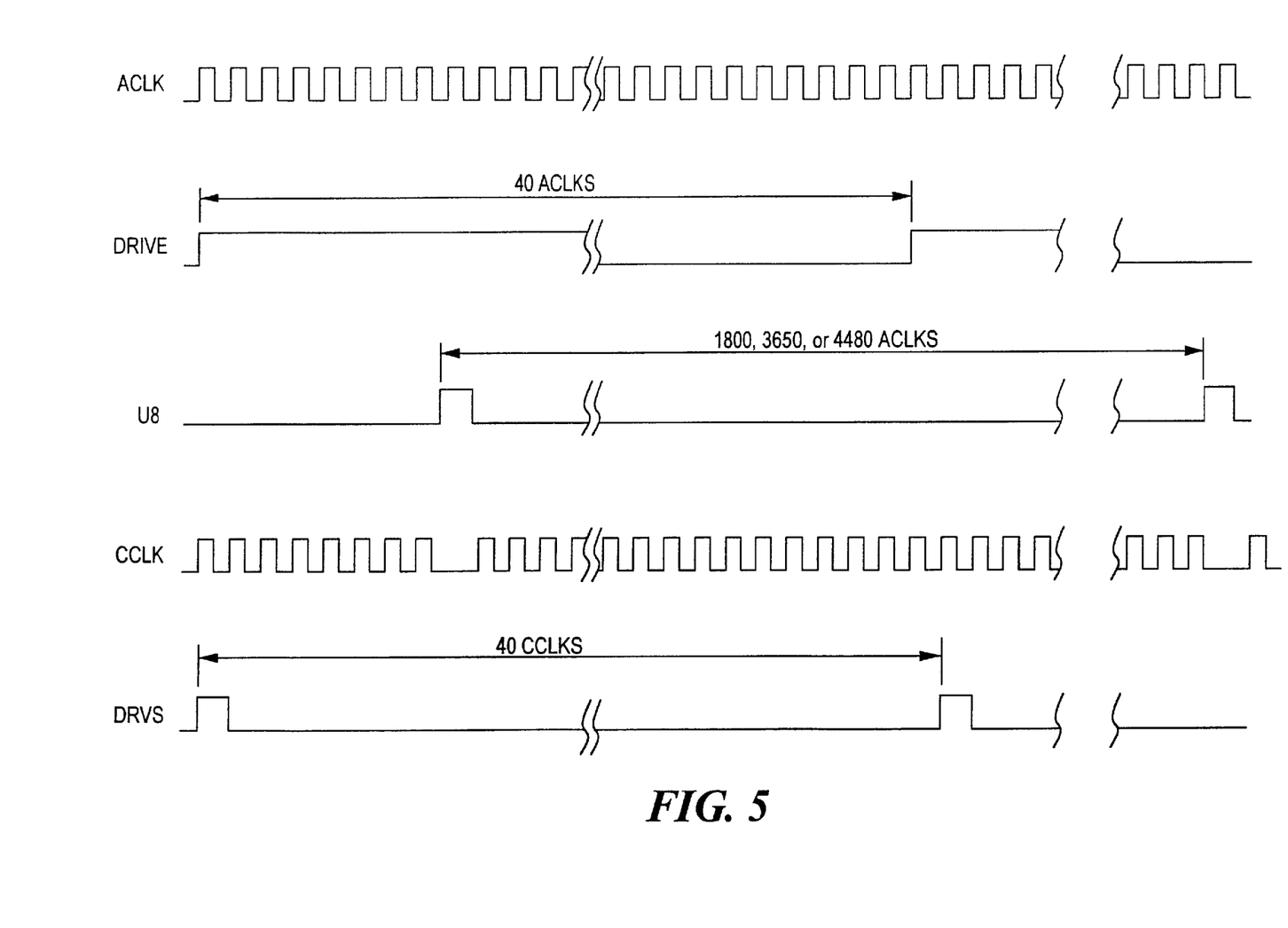
FIG. 5 is a timing diagram of various signals in the controller circuit of FIG. 2.

FIG. 5 shows the relationships among several signals within the controller 12 from which the signals DRV1, DRV2, and DRVS are generated. The signal DRIVE, from which the signals DRV1 and DRV2 are created, is a square wave whose frequency is 89.488 KHz, or $\frac{1}{40}$ the ACLK frequency of 3.579545 MHz. The output of the one-shot U8 is a pulse signal whose pulse rate is 1.989 KHz, 980.7 Hz, or 799 Hz, corresponding to 1800, 3650, or 4480 ACLK cycles respectively. The signal CCLK is a copy of ACLK except for a missing pulse at each assertion of the output of U8. Thus the frequency of CCLK is equal to the difference between 3.579545 MHz and the frequency of the U8 output signal.

The frequency of the pulse signal DRVS depends on the value of the signal RINGEN. When the signal RINGEN is asserted (which is the situation shown in FIG. 5), the frequency of the signal DRVS is $\frac{1}{40}$ the frequency of CCLK. This frequency differs from the 89.488 KHz frequency of the signal DRIVE by 50, 25, or 20 Hz, these frequencies corresponding respectively to $\frac{1}{40}$ of the 1.989 KHz, 980.7 Hz, or 799 Hz frequencies of the U8 output. When the signal RINGEN is de-asserted, the frequency of DRVS is equal to the 89.488 KHz frequency of DRIVE, and its phase is shifted by an amount determined by the output of the latch U14. This slight phase shift introduces a corresponding DC voltage shift on Vout. The different values of the DRVS frequency are responsible for providing either pure DC, a 50 Hz ringing signal, a 25 Hz ringing signal, or a 20 Hz ringing signal on the attached telephone line.

Figure 6:
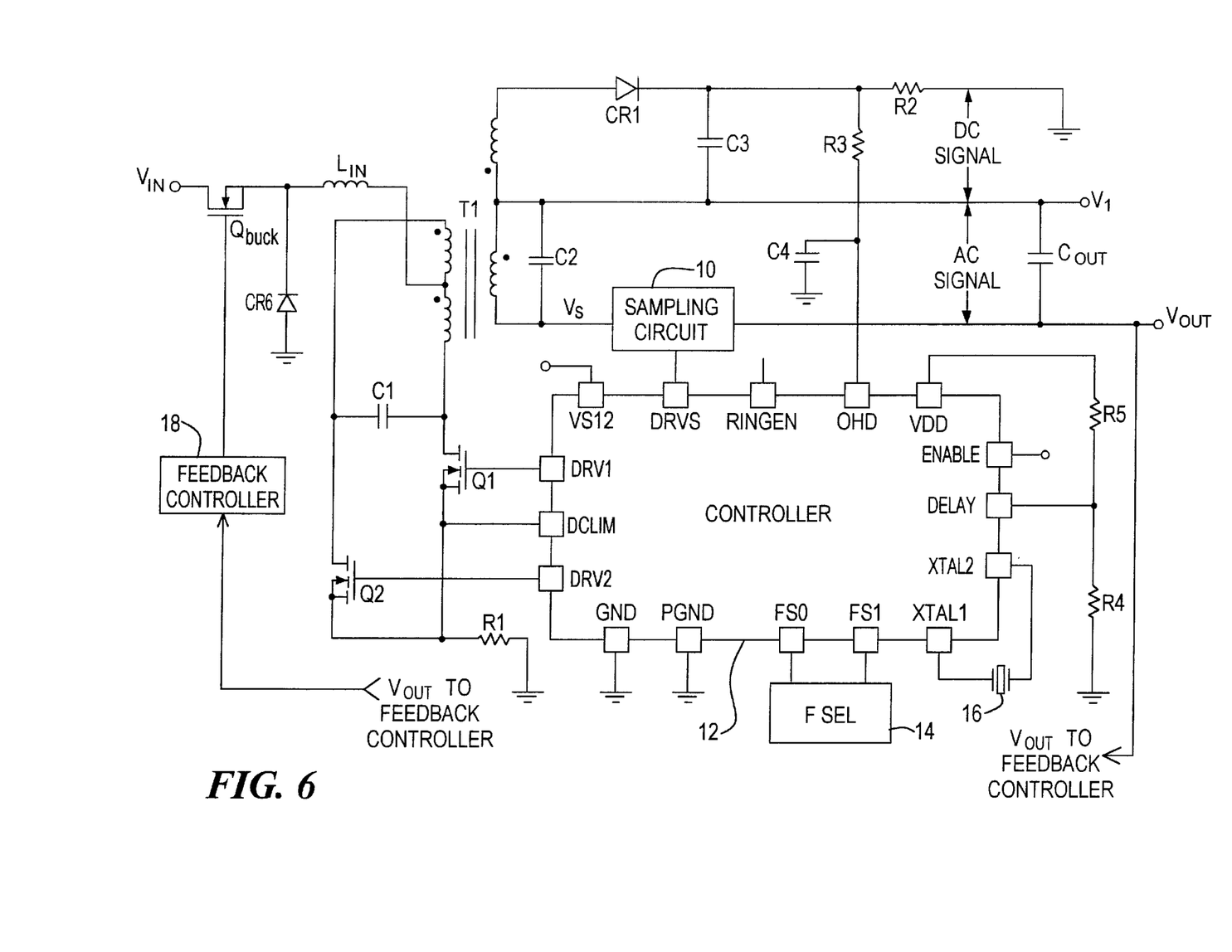
FIG. 6 is a schematic diagram of an alternative ring signal and DC power generator circuit in accordance with the principles of the present invention.

FIG. 6 shows a modification of the circuit of FIG. 1 which allows closed loop control of the output voltage to achieve better load regulation. The additional circuitry forms a buck regulator. The output signal Vout is provided to a feedback controller 18, whose output controls a switching transistor Qbuck. By controlling the duty cycle of Qbuck based on the feedback information, the resonant tank voltage can be controlled. For example, when the output droops at higher load conditions, the duty cycle of Qbuck is increased, effectively increasing the voltage Vs and restoring the voltage Vout.

The foregoing has described a specific ring signal generator circuit having advantageous features. It may be convenient in other embodiments of the invention to use different circuit structures to obtain the desired results. For example, the signal Vs can be sampled at frequencies greater than the frequency of Vs by the desired ring signal frequencies, rather than at frequencies less than the frequency of Vs as shown. A different primary switching rate might be used, in which case the entire set of frequencies may be changed by a corresponding amount. The signals can also be generated using a crystal having a different frequency and counters with different counts. The signals might alternatively be generated by a phase-locked loop. Also, alternative rectifier, sampling, and primary-side switching circuit structures may be employed. In particular, the capacitor C1 is optional and can be combined with C2 without any substantial impact on circuit performance. Additionally, the senses resistors can be replaced by other current sensing components such as a current-sensing transformer.

Accordingly, the present invention is not to be limited in scope by the specific embodiments described herein. Indeed, various modifications to the present invention, in addition to those described, will be apparent to those of skill in the art from the foregoing description and accompanying drawings. Thus, such modifications are intended to fall within the scope of the appended claims.

What is claimed is:

1. A circuit for providing a ring signal and DC power to a telephone line, comprising:

a rectifier operative to convert AC power into DC power to be provided to the telephone line as a DC voltage and a DC current, the AC power having a substantially sinusoidal voltage component of a predetermined frequency substantially greater than the ring signal to be provided to the telephone line;

a sampling circuit operative to sample the AC power at the frequency of a pulsed sampling signal, the sampled power being additively combined with the DC power from the rectifier to form a ring signal component of the power to be provided to the telephone line; and a control circuit operative to pulse the sampling signal at a first predetermined frequency when a ring signal is not to be provided to the telephone line and to pulse the sampling signal at a second predetermined frequency when the ring signal is to be provided to the telephone line, the second pulse frequency being different from the frequency of the AC voltage and current by the frequency of the ring signal, and the first pulse frequency being equal to the frequency of the AC voltage and current.

2. A circuit according to claim 1, further comprising:

a transformer having a DC power source coupled to the primary thereof;

a capacitor forming a resonant circuit with the inductance of the transformer primary; and a switching network coupled to the primary of the transformer, each switch in the network being operative in response to a corresponding pulsed drive signal to intermittently conduct current from the DC power source through the primary of the transformer;

and wherein (i) the rectifier and sampling circuit are coupled to receive the AC power from the secondary of the transformer, and (ii) the control circuit is operative to pulse the drive signal of each switch in the switching network at the first frequency to generate the AC power.

3. A circuit according to claim 1, wherein the control circuit comprises:

a signal generator operative to generate a signal corresponding to the second frequency;

a current-sensing component connected to sense the DC current being provided to the telephone line;

an off-hook detection circuit coupled to the current-sensing component to detect when a telephone connected to the telephone line is in the off-hook condition; and a selector operative to generate the sampling signal from the signal generated by the signal generator when (i) a ring enable signal provided to the control circuit is asserted and (ii) the off-hook condition is not detected.

4. A circuit according to claim 3, wherein the current-sensing component comprises a sense resistor.

5. A circuit according to claim 3, wherein the signal generator comprises:

an oscillator operative to generate an oscillator signal having a frequency substantially greater than the second frequency;

a first counter operative to generate a first divided signal having a frequency being an integral divisor of the oscillator signal frequency;

a first one-shot pulse generator operative to generate a pulse signal from the first divided signal; and a second counter operative to generate a second divided signal having a frequency being an integral divisor of the frequency of the pulse signal from the first one-shot pulse generator.

6. A circuit according to claim 1, further comprising: signal generators respectively generating signals corresponding to ringing signals of different frequencies; and a selector operative to select the signal generated by a selected one of the signal generators;

and wherein the sampling signal is generated from the selected signal when the ring signal is to be provided to the telephone line.

7. A circuit according to claim 6, further comprising an oscillator operative to generate an oscillator signal having a frequency substantially greater than the second frequency, and wherein each signal generator comprises a corresponding counter operative to generate a corresponding different-frequency divided signal, each divided signal frequency being an integral divisor of the oscillator signal frequency.

8. A circuit according to claim 1, wherein the sampling circuit comprises:

a bridge rectifier circuit having one opposite pair of terminals connected between the source of the AC power and the telephone line;

a switch connected between the other opposite pair of terminals of the bridge rectifier circuit; and a pulse transformer operative to couple the sampling signal to the switch to control the operation thereof.

9. A circuit according to claim 1, wherein the sampling circuit comprises:

a pair of switches connected back-to-back in series between the source of the AC power and the telephone line; and a pulse transformer operative to couple the sampling signal to the switches to control the operation thereof.

10. A circuit according to claim 1, further comprising a variable delay circuit operative to adjust the phase at which the sampling signal is pulsed in order to make a corresponding adjustment in the DC voltage of the DC power provided to the telephone line.

11. A control circuit for a ring signal generator, comprising:

a first signal generator operative to generate a first pulse signal of a first pulse frequency;

a second signal generator operative to generate a second pulse signal of a second pulse frequency different from the first frequency by the desired frequency of a ring signal to be supplied to a telephone line to which the ring signal generator is coupled;

a pair of switch drivers operative to generate switch drive signals for controlling switches on the primary side of a transformer-based resonant circuit in the ring signal generator, the switch drive signals being generated from the first pulse signal such that the switch drive signals are pulsed signals having a duty cycle of substantially 50% and a pulse rate equal to the first frequency;

a sampling circuit driver operative to generate a pulsed sampling signal for controlling a sampling circuit on the secondary side of the resonant circuit, the sampling signal being generated from a selected pulse signal such that the sampling signal is a pulsed signal having a pulse rate equal to the frequency of the selected signal; and a selector operative to select the first pulse signal as the signal from which the sampling signal is generated when the ring signal is not to be supplied to the telephone line, and to select the second pulse signal as the signal from which the sampling signal is generated when the ring signal is to be supplied to the telephone line.

12. A control circuit according to claim 11, further comprising an off-hook detection circuit having an input on which appears a signal indicative of DC current being supplied to the telephone line, the off-hook detection circuit being operative to detect when a telephone connected to the telephone line is in the off-hook condition, and wherein the selector is operative to select the second pulse signal when (i) a ring enable signal provided to the control circuit is asserted and (ii) the off-hook condition is not detected.

13. A control circuit according to claim 11, further comprising:

additional signal generators operative to generate pulse signals of pulse frequencies different from the first frequency by other desired frequencies of the ring signal; and an additional selector operative to select from among the second pulse signal and the pulse signals generated by the additional signal generators as the signal from which the sampling signal is generated when the ring signal is to be supplied to the telephone line.

14. A circuit according to claim 11, further comprising an oscillator operative to generate an oscillator signal having a frequency substantially greater than the first frequency, and wherein each signal generator comprises a corresponding counter operative to generate the corresponding pulse signal by integrally dividing the oscillator signal frequency.

15. A circuit according to claim 11, further comprising a variable delay circuit operative to adjust the phase at which the sampling signal is pulsed when the ring signal is not to be supplied to the telephone line.

* * * * *